United States Patent
Yamakage et al.

(10) Patent No.: US 10,911,213 B2
(45) Date of Patent: *Feb. 2, 2021

(54) TRANSMITTING SYSTEM, TRANSMISSION SLOTTING APPARATUS, RECEIVING APPARATUS, AND TRANSMISSION SLOT GENERATING METHOD

(71) Applicants: KABUSHIKI KAISHA TOSHIBA, Minato-ku (JP); Toshiba Infrastructure Systems & Solutions Corporation, Kawasaki (JP)

(72) Inventors: Tomoo Yamakage, Yokohama (JP); Tatsuya Tanaka, Kawasaki (JP); Yasumichi Hashi, Fuchu (JP); Keita Iwami, Fuchu (JP); Minoru Abe, Sagamihara (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,169

(22) Filed: Jan. 6, 2020

(65) Prior Publication Data

US 2020/0145184 A1    May 7, 2020

Related U.S. Application Data

(60) Division of application No. 15/706,068, filed on Sep. 15, 2017, now Pat. No. 10,574,436, which is a
(Continued)

(30) Foreign Application Priority Data

Mar. 17, 2015    (JP) ................... 2015-053838

(51) Int. Cl.
*H04L 7/04*    (2006.01)
*H04L 29/06*    (2006.01)
(Continued)

(52) U.S. Cl.
CPC ............. *H04L 7/041* (2013.01); *H04H 20/28* (2013.01); *H04H 60/07* (2013.01); *H04J 3/16* (2013.01);
(Continued)

(58) Field of Classification Search
CPC ..... H04L 7/041; H04L 65/607; H04L 65/601; H04L 29/0651; H04L 29/08756;
(Continued)

(56) References Cited

U.S. PATENT DOCUMENTS

| 6,233,251 B1 | 5/2001 | Kurobe et al. |
| 2007/0126612 A1 | 6/2007 | Miller |
| 2017/0279865 A1 | 9/2017 | Iguchi |

FOREIGN PATENT DOCUMENTS

| JP | 10-262015 | 9/1998 |
| JP | 2009-049987 | 3/2009 |

(Continued)

OTHER PUBLICATIONS

"Video Coding, Audio Coding and Multiplexing Specifications for Digital Broadcasting," Dec. 2014, ARIB STD-B32 Version 3.1, 480 Pages.
(Continued)

*Primary Examiner* — Joshua Kading
(74) *Attorney, Agent, or Firm* — Oblon, McClelland, Maier & Neustadt, L.L.P.

(57) ABSTRACT

A transmitting system includes a variable-length packet multiplexing apparatus and a transmission slotting apparatus. The variable-length packet multiplexing apparatus generates a variable-length packet. The transmission slotting
(Continued)

apparatus stores the variable-length packet in slots forming transmission main signals. The transmission slotting apparatus includes a capacity calculator, an extractor, a remainder calculator, a selector, and a slot information multiplexer. The capacity calculator calculates a data capacity of the transmission main signals for one frame. The extractor extracts a byte number of the variable-length packet. The remainder calculator calculates a remaining capacity of the transmission main signals. The selector stores a predetermined data sequence in a region left in the slots, and outputs the slots storing the data sequence. The slot information multiplexer multiplexes slot information and the slots output by the selector.

1 Claim, 12 Drawing Sheets

Related U.S. Application Data continuation of application No. PCT/JP2015/085702, filed on Dec. 21, 2015.

(51) Int. Cl.
*H04L 29/08* (2006.01)
*H04H 60/07* (2008.01)
*H04J 3/24* (2006.01)
*H04J 3/16* (2006.01)
*H04H 20/28* (2008.01)
*H04N 21/643* (2011.01)

(52) U.S. Cl.
CPC ............ *H04J 3/1682* (2013.01); *H04J 3/247* (2013.01); *H04L 29/0651* (2013.01); *H04L 29/06482* (2013.01); *H04L 29/08756* (2013.01); *H04L 65/601* (2013.01); *H04L 65/607* (2013.01); *H04L 67/2823* (2013.01); *H04L 2007/045* (2013.01); *H04N 21/64322* (2013.01)

(58) Field of Classification Search
CPC .......... H04L 29/06482; H04L 67/2823; H04L 2007/045; H04J 3/1682; H04J 3/247; H04J 3/16; H04H 60/07; H04H 20/28; H04N 21/64322
See application file for complete search history.

(56) References Cited

FOREIGN PATENT DOCUMENTS

| | | |
|---|---|---|
| JP | 2009-130678 | 6/2009 |
| JP | 2009-182751 | 8/2009 |
| JP | 2009-182751 A | 8/2009 |
| JP | 2011-103568 | 5/2011 |
| JP | 2011-103568 A | 5/2011 |
| JP | 2016-171568 | 9/2016 |
| JP | 2016-171568 A | 9/2016 |
| WO | WO 2010/106796 A1 | 9/2010 |

OTHER PUBLICATIONS

"Transmission System for Advanced Wide Band Digital Satellite Broadcasting," Jul. 2014, ARIB STD B-44, Version 2.0, 134 Pages.
International Search Report dated Feb. 16, 2016 in PCT/JP2015/085702 filed Dec. 21, 2015 (with English Translation).
Written Opinion dated Feb. 16, 2016 in PCT/JP2015/085702 filed Dec. 21, 2015.

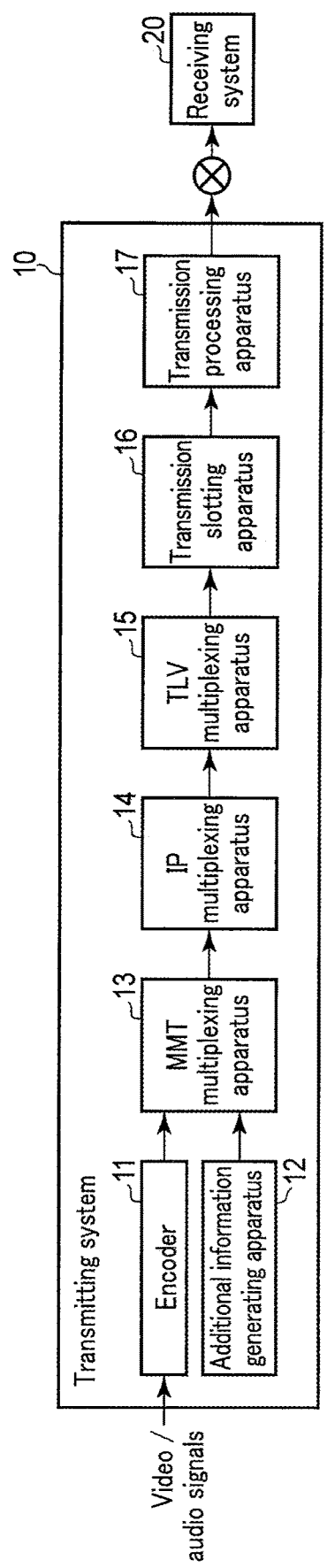
F I G. 1

| | | | | | |
|---|---|---|---|---|---|
| Slot#1 | H 22B | Main signals | BCH 24 bytes | Stf 6 bits | LDPC 3693.25 bytes | S+P+T |
| Slot#2 | H 22B | Main signals | BCH 24 bytes | Stf 6 bits | LDPC 3693.25 bytes | S+P+T |
| Slot#3 | H 22B | Main signals | BCH 24 bytes | Stf 6 bits | LDPC 3693.25 bytes | S+P+T |
| Slot#4 | H 22B | Main signals | BCH 24 bytes | Stf 6 bits | LDPC 3693.25 bytes | S+P+T |

......

S+P+T=Synchronization signal+ Signal point arrangement information+ TMCC signal

F I G. 5

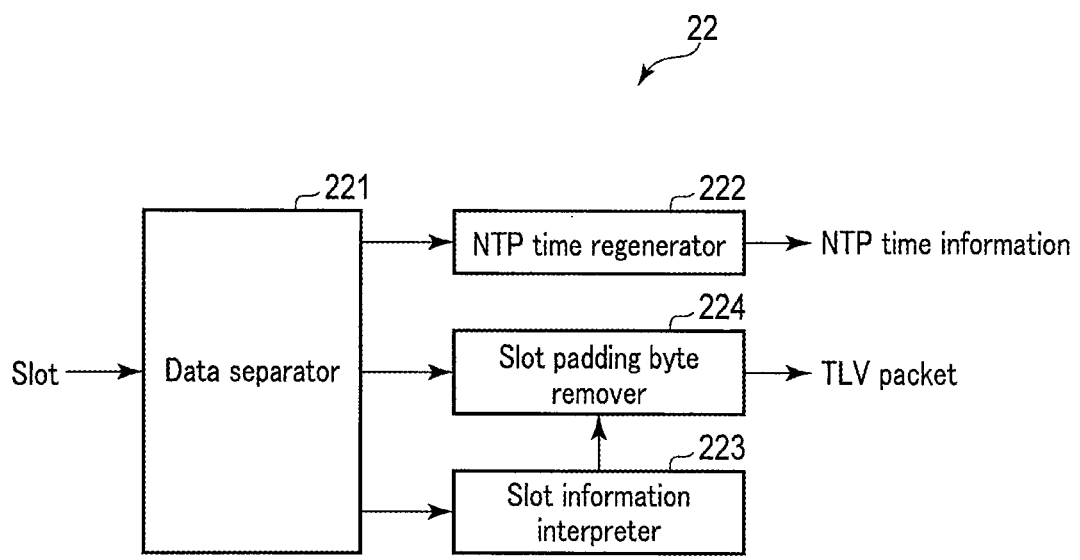
F I G. 11

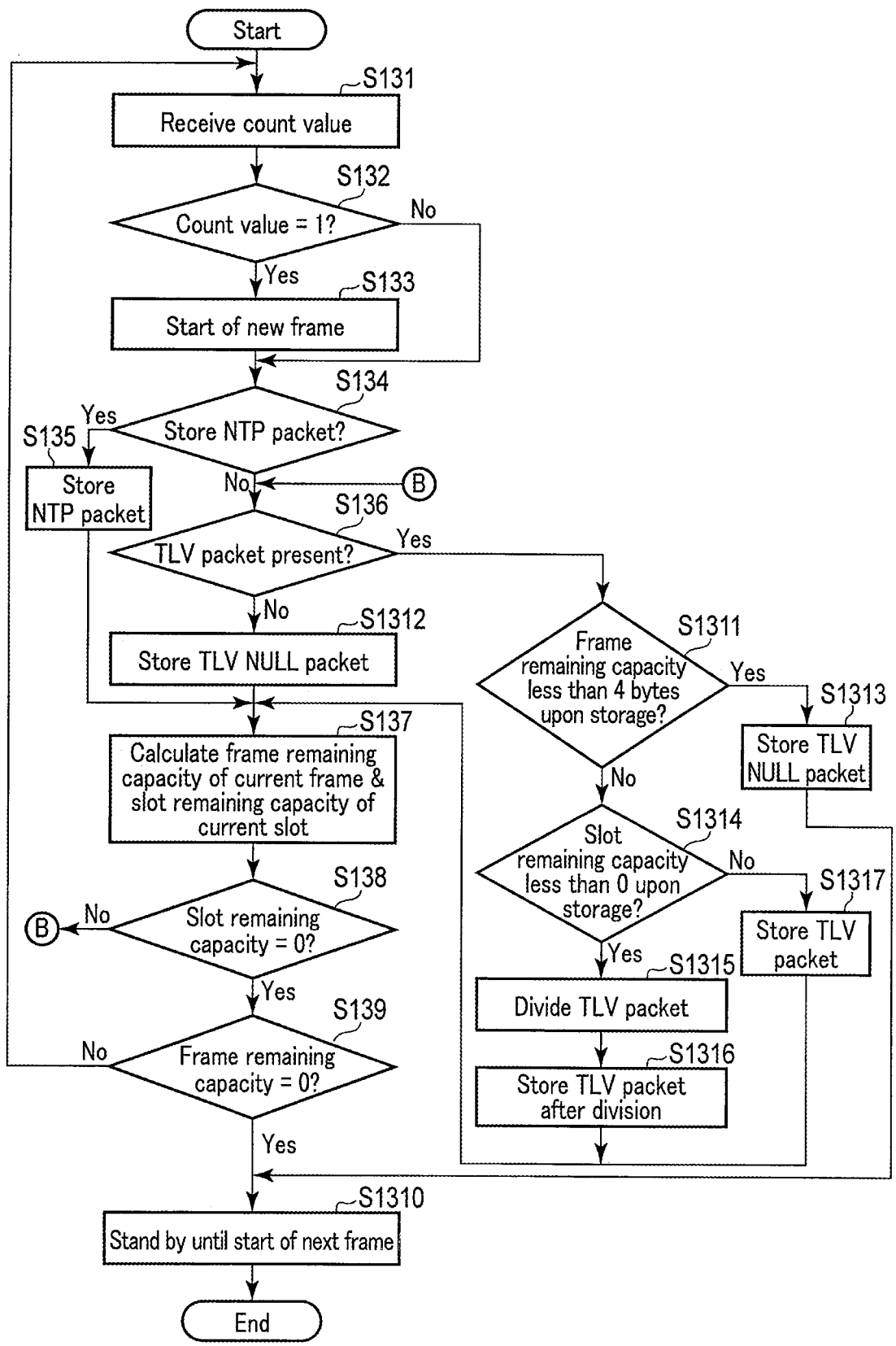
F I G. 13

TRANSMITTING SYSTEM, TRANSMISSION SLOTTING APPARATUS, RECEIVING APPARATUS, AND TRANSMISSION SLOT GENERATING METHOD

CROSS-REFERENCE TO RELATED APPLICATIONS

This application is a Divisional Application of U.S. Ser. No. 15/706,068 filed Sep. 15, 2017, which is a Continuation Application of PCT Application No. PCT/JP2015/085702, filed Dec. 21, 2015 and based upon and claiming the benefit of priority from prior Japanese Patent Application No. 2015-053838, filed Mar. 17, 2015, the entire contents of each of which are incorporated herein by reference.

FIELD

Embodiments described herein relate generally to a transmitting system, a transmission slotting apparatus, a receiving apparatus, and a transmission slot generating method.

BACKGROUND

In broadcasting systems at present, Moving Picture Experts Group-2 Transport Stream (MPEG-2 TS) and Real-time Transport Stream (RTP) media transport schemes are being widely used. These schemes, however, face various limitations if cooperation between broadcasting and communication is attempted. So, MPEG Media Transport (MMT) has been proposed as a new media transport scheme that assumes the use of various networks with MPEG.

An MMT-adopted transmitting system converts MPEG Media Transport Protocol (MMTP)/User Datagram Protocol (UDP)/Internet Protocol (IP) packets into Type Length Value (TLV) packets. The transmitting system stores TLV packets in slots to generate transmission main signals. The transmission main signals are generated in units of slots, and their transmission control setting is updated for each frame of 120 slots, for example. The transmitting system performs modulation processes, etc. on the transmission main signals and transmits them as broadcast waves.

When a transmitting system generates transmission main signals by storing TLV packets in slots, the transmission main signals for a frame may have a last valid slot with a remaining capacity of less than 4 bytes. Unfortunately, a TLV packet requires a minimum capacity of 4 bytes, and if the slot's remaining capacity falls below 4 bytes, it is no longer possible to store a TLV packet in that slot. Such an instance may pose problems for the transmitting system to transmit broadcast waves.

BRIEF DESCRIPTION OF THE DRAWINGS

FIG. 1 is a block diagram illustrating a transmitting system and a receiving system according to a first embodiment.

FIG. 5 is a diagram illustrating slot structures of the transmission main signals output from the slot information multiplexer of FIG. 4 to the transmission processing apparatus.

FIG. 11 is a block diagram illustrating a functional configuration of the transmission main signal receiving apparatus of FIG. 10.

FIG. 13 is a flowchart showing the processes to perform when the selector of FIG. 12 stores received data in slots.

DETAILED DESCRIPTION

Figure 2:
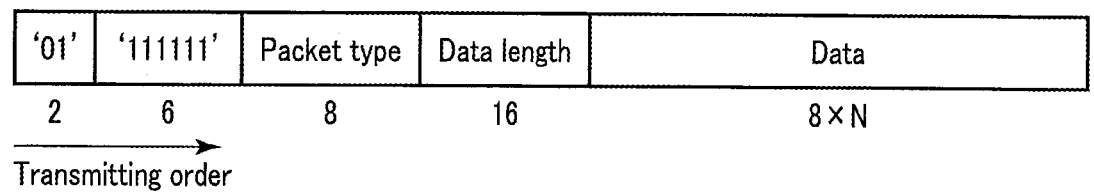
FIG. 2 is a diagram illustrating a structure of a TLV packet generated by the TLV multiplexing apparatus of FIG. 1.

In general, according to one embodiment, a transmitting system includes a variable-length packet multiplexing apparatus and a transmission slotting apparatus. The variable-length packet multiplexing apparatus generates a variable-length packet comprising information indicative of a type of data and information indicative of a byte number of the data. The transmission slotting apparatus stores the variable-length packet in any of a plurality of slots forming transmission main signals. The transmission slotting apparatus includes a capacity calculator, an extractor, a remainder calculator, a selector, and a slot information multiplexer. The capacity calculator receives setting information for the transmission main signals for one frame, and calculates, based on the setting information, a data capacity of the transmission main signals for one frame. The extractor extracts a byte number of the variable-length packet. The remainder calculator calculates a remaining capacity of the transmission main signals based on the data capacity calculated by the capacity calculator and the byte number extracted by the extractor. The selector stores a predetermined data sequence in a region left in the slots if the remaining capacity of the transmission main signals having stored the variable-length packet in any of the slots is less than a minimum byte number of a variable-length packet, and outputs the slots storing the data sequence. The slot information multiplexer multiplexes slot information and the slots output by the selector.

Hereinafter, embodiments will be described with reference to the accompanying drawings.

First Embodiment

FIG. 1 is a block diagram illustrating a transmitting system 10 and a receiving system 20 according to the first embodiment. The transmitting system 10 transmits broadcast waves. The transmitted broadcast waves reach the receiving system 20 via transmission channels such as a broadcast network. The receiving system 20 receives the broadcast waves.

[Transmitting System 10]

The transmitting system 10 shown in FIG. 1 includes an encoder 11, an additional information generating apparatus 12, an MPEG Media Transport (MMT) multiplexing apparatus 13, an Internet Protocol (IP) multiplexing apparatus 14, a Type Length Value (TLV) multiplexing apparatus 15, a transmission slotting apparatus 16, and a transmission processing apparatus 17.

The encoder 11 receives video and/or audio signals from, for example, imaging apparatuses such as a camera, or a server, etc. The encoder 11 encodes the received video and/or audio signals based on preset methods to convert them into encoded signals. The encoder 11 outputs the encoded signals to the MMT multiplexing apparatus 13.

The additional information generating apparatus 12 generates information including broadcast program guides, information on accounting, encryption, etc. of distribution video content, and so on, and outputs them as additional information to the MMT multiplexing apparatus 13. Although FIG. 1 does not show an encryptor (scrambler) in the transmitting system 10, an encryptor may be provided, for example, between the MMT multiplexing apparatus 13 and the IP multiplexing apparatus 14.

The MMT multiplexing apparatus 13 includes, for example, a Central Processing Unit (CPU), a memory for use with the CPU's processing, and a Field Programmable Gate Array (FPGA), etc. to perform given processing under the control of the CPU. With the CPU causing the FPGA to perform the given processing, the MMT multiplexing apparatus 13 processes the encoded signals. Specifically, the MMT multiplexing apparatus 13 adds the additional information to the encoded signals, and stores the additional information-added encoded signals in an MPEG Media Transport Protocol (MMTP) packet. The MMT multiplexing apparatus 13 outputs the MMTP packet to the IP multiplexing apparatus 14.

Note that the MMT multiplexing apparatus 13 may include a Large-Scale Integration (LSI) instead of the FPGA. Also, the MMT multiplexing apparatus 13 may perform the given processing by software.

The IP multiplexing apparatus 14 includes, for example, a CPU, a memory for use in the CPU's processing, and an FPGA, etc. to perform given processing under the control of the CPU. With the CPU causing the FPGA to perform the given processing, the IP multiplexing apparatus 14 processes the MMTP packet. Specifically, the IP multiplexing apparatus 14 stores the MMTP packet in an IP packet. The IP multiplexing apparatus 14 outputs the IP packet to the TLV multiplexing apparatus 15.

The IP multiplexing apparatus 14 may include an LSI instead of the FPGA. Also, the IP multiplexing apparatus 14 may perform the given processing by software.

The TLV multiplexing apparatus 15 includes, for example, a CPU, a memory for use in the CPU's processing, and an FPGA, etc. to perform given processing under the control of the CPU. With the CPU causing the FPGA to perform the given processing, the TLV multiplexing apparatus 15 processes the IP packet. Specifically, the TLV multiplexing apparatus 15 generates a TLV packet based on the IP packet.

FIG. 2 is a schematic diagram illustrating a structure of the TLV packet generated by the TLV multiplexing apparatus 15. As shown in FIG. 2, the TLV packet consists of 2 bits for "01", 6 reserved bits for "111111", 8 bits for "packet type" for identifying the type of the packet stored in TLV, 16 bits for "data length" for writing the byte number of the succeeding data, and the data that has the byte number indicated by the data length. If the data length is 0, that is, the data has a byte number 0, the TLV packet accounts for the minimum volume of 4 bytes (2 bits+6 bits+8 bits+16 bits+0 byte).

The TLV multiplexing apparatus 15 outputs the TLV packet to the transmission slotting apparatus 16.

The TLV multiplexing apparatus 15 may include an LSI instead of the FPGA. Also, the TLV multiplexing apparatus 15 may perform the given processing by software.

The transmission slotting apparatus 16 includes, for example, a CPU, a memory for use in the CPU's processing, and an FPGA, etc. to perform given processing under the control of the CPU. With the CPU causing the FPGA to perform the given processing, the transmission slotting apparatus 16 processes the TLV packet. Specifically, the transmission slotting apparatus 16 stores the TLV packet in any of the slots that form transmission main signals, and thereby generates the transmission main signals. The transmission slotting apparatus 16 outputs the generated transmission main signals to the transmission processing apparatus 17.

The transmission main signals are generated in units of slots. Transmission mode setting for the transmission main signals is updated for each frame of 120 slots, based on setting information. The setting information includes information about transmission modes, such as modulation schemes and coding rates, for the 120 slots in the transmission main signals.

The transmission processing apparatus 17 includes, for example, a modulator and a power amplifier. Signals amplified by the power amplifier serve as broadcast waves.

Figure 3:
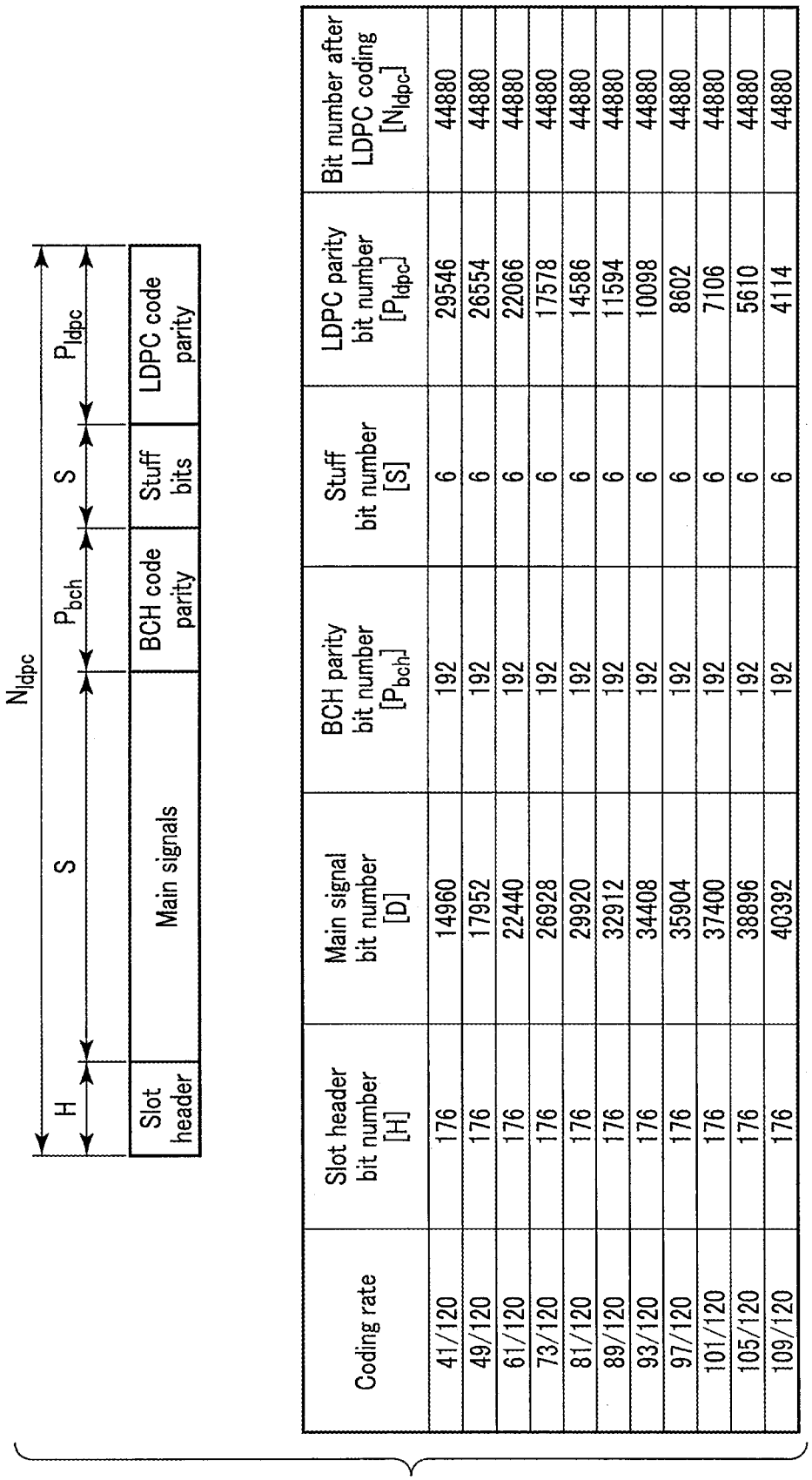
FIG. 3 is a diagram illustrating a structure of a slot according to the first embodiment.

FIG. 3 is a schematic diagram showing an exemplary structure of the slots. The slot may be understood as a signal having a slot header and a main signal portion, to which an error correction outer code, stuff bits, and further an error correction inner code are added. The main signal portion stores at least one of a TLV packet that contains an MMTP packet, a TLV packet that contains an NTP (Network Time Protocol) packet, a TLV NULL packet, and slot padding bytes as will be discussed.

Figure 4:
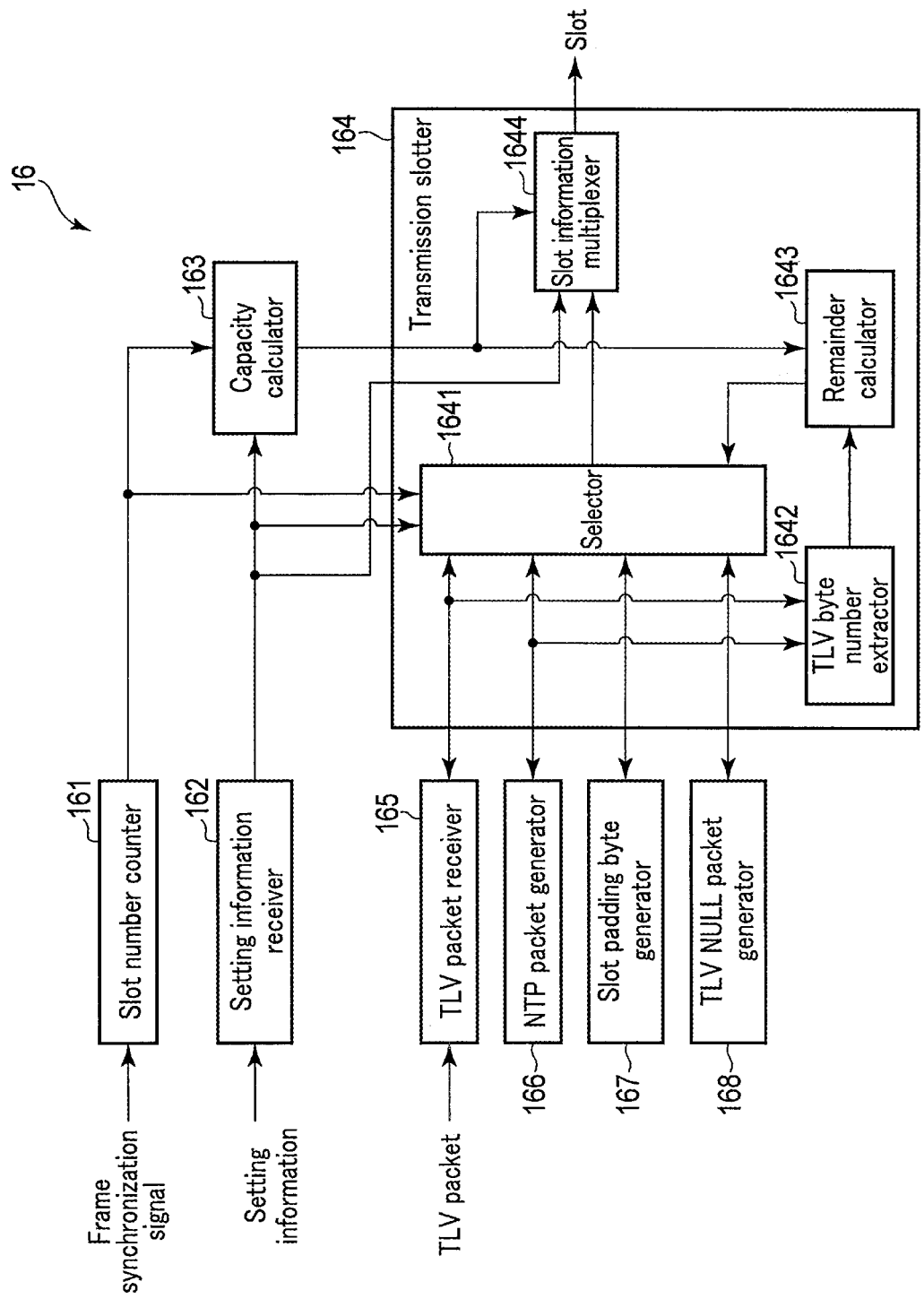
FIG. 4 is a block diagram illustrating an exemplary functional configuration of the transmission slotting apparatus of FIG. 1.

FIG. 4 is a block diagram illustrating an exemplary functional configuration of the transmission slotting apparatus 16 shown in FIG. 1. FIG. 4 shows a slot number counter 161, a setting information receiver 162, a capacity calculator 163, a transmission slotter 164, a TLV packet receiver 165, an NTP packet generator 166 where the generated NTP packet is contained in a TLV packet, a slot padding byte generator 167, and a TLV NULL packet generator 168, and each of these functions is realized by the CPU causing the FPGA to perform given processing. The transmission slotting apparatus 16 may include an LSI instead of the CPU and the FPGA in order to realize the functions shown in FIG. 4. The transmission slotting apparatus 16 may also realize the functions shown in FIG. 4 by software.

The slot number counter 161, upon receipt of a frame synchronization signal, sets a count value to 1 and then restarts counting using a transmission clock. Upon passage of the clock count for the transmission of data having the slot structure of FIG. 3, the slot number counter 161 increments the slot number by 1 and counts the clock for the transmission of the next slot. This will allow the counting to start concurrently with the start of the frame. The slot number counter 161 outputs the count value to the capacity calculator 163 and a selector 1641.

The setting information receiver 162 receives setting information for the transmission main signals to set the transmission mode for each frame. The setting information receiver 162 outputs the setting information to the capacity calculator 163 and the transmission slotter 164.

The coding rate contained in the setting information can be set as, for example, the coding rates shown in FIG. 3. The bit number of the main signals will vary according to the variation in coding rate.

Also, the modulation scheme contained in the setting information may be, for example, 16 amplitude phase shift keying (16APSK), 8 phase shift keying (8PSK), quadrature phase shift keying (QPSK), π/2-shift binary phase shift keying (π/2-shift BPSK), etc. If there are 5 slot units under the 16APSK, 4 slots are valid and 1 slot is invalid. Also, if there are 5 slot units under the 8PSK, 3 slots are valid and 2 slots are invalid. If there are 5 slot units under the QPSK, 2 slots are valid and 3 slots are invalid. If there are 5 slot units under the π/2-shift BPSK, 1 slot is valid and 4 slots are invalid. The total bit number of the main signals for every 5 slots is determined according to the combination of the modulation scheme and the coding rate contained in the setting information.

It is not a limitation that the setting information contains only one combination of the modulation scheme and the coding rate. The setting information may contain two or more combinations of the modulation scheme and the coding rate. If there are more than one combination, the transmission mode is assigned to slots sequentially in an ascending order from the slot number 1, using the combination with a modulation scheme having a larger multi-value first or, if the modulation schemes are the same, using the combination with a higher coding rate first.

The capacity calculator 163 receives the count value from the slot number counter 161 and the setting information from the setting information receiver 162. The capacity calculator 163, upon receiving the initial count value for the frame, i.e. "1", calculates the capacity of the valid main signal portion for the frame as a frame main signal capacity, based on the bit number of the main signals determined by the coding rate and the ratio between valid slots and invalid slots determined by the modulation scheme. Also, the capacity calculator 163, upon receiving the count value from the slot number counter 161, calculates the capacity of the valid main signal portion in the slot represented by the number of the count value, as a slot main signal capacity. After calculating the frame main signal capacity and the slot main signal capacity, the capacity calculator 163 outputs the information of these calculated capacities to the transmission slotter 164.

If two or more combinations of the modulation scheme and the coding rate are contained in the setting information, the capacity calculator 163 calculates a pseudo-frame main signal capacity for each combination. The capacity calculator 163 uses a pseudo-slot main signal capacity for the slot start point assigned according to the combination of the modulation scheme and the coding rate contained in the setting information.

The TLV packet receiver 165 receives the TLV packet from the TLV multiplexing apparatus 15. The TLV packet receiver 165 includes a buffer (not illustrated) and retains the received TLV packet in the buffer. The TLV packet receiver 165 outputs the retained TLV packet to the transmission slotter 164 in response to an instruction from the transmission slotter 164.

The NTP packet generator 166 generates an NTP-type IP packet. The NTP packet generator 166 arranges the IP packet in the form of TLV to generate an NTP packet.

ARIB STD-44 edition 2.0 prescribes that an NTP packet contained in a TLV packet be disposed at the head of the first slot for a frame among the slots allocated for each TLV stream ID. The aim of this is to suppress the delay variation of NTP packets. Also, if two or more combinations of the modulation scheme and the coding rate are involved in the same TLV stream ID, an NTP packet may be disposed at the head of the first slot adopting the combination having the highest error resilience.

The NTP packet generator 166 receives a notification about the timing to insert an NTP packet from the transmission slotter 164, and outputs the NTP packet containing that NTP time (system time) to the transmission slotter 164. The NTP packet generator 166 may correct the NTP time through addition or subtraction of an externally-set offset.

The slot padding byte generator 167 generates a predetermined data sequence as slot padding bytes, in response to an instruction from the transmission slotter 164. The first byte of the TLV packet is, as shown in FIG. 2, "0x7f". As the slot padding bytes, the slot padding byte generator 167 generates a data sequence different from "0x7f", e.g., "0x7e". The slot padding bytes are not limited to "0x7e", but may be any value other than "0x7f" where the first (or the most significant) two bits shall be '01' in binary representation.

The slot padding byte generator 167 may generate the slot padding bytes so that the low 2 bits thereof will represent a remaining capacity of the last valid slot in the transmission main signals. That is, the slot padding bytes may be "0x7e" when the remaining capacity is 3 bytes, "0x7d" when the remaining capacity is 2 bytes, and "0x7c" when the remaining capacity is 1 byte. The slot padding byte generator 167 outputs the generated slot padding bytes to the transmission slotter 164.

The TLV NULL packet generator 168 receives an instruction from the transmission slotter 164 and generates a TLV NULL packet of the instructed volume. The TLV NULL packet generator 168 outputs the generated TLV NULL packet to the transmission slotter 164. The TLV NULL packet generator 168 may generate two or more TLV NULL packets. For example, if the instructed volume exceeds a predetermined volume, e.g., 1500 bytes, the TLV NULL packet generator 168 generates a plurality of TLV NULL packets each up to 1500 bytes as a maximum volume. Note that the maximum volume of TLV NULL packet is not necessarily aligned with that of regular TLV packet that contains an MMTP packet or an NTP packet.

The transmission slotter 164 includes the selector 1641, a TLV byte number extractor 1642, a remainder calculator 1643, and a slot information multiplexer 1644.

The TLV byte number extractor 1642 receives the TLV packet from the TLV packet receiver 165, or the NTP packet from the NTP packet generator 166. The TLV byte number extractor 1642 extracts the data length, shown in FIG. 2, of the received TLV packet or the received NTP packet, and obtains the data volume included in the TLV packet or the NTP packet. The TLV byte number extractor 1642 outputs information about the obtained data volume to the remainder calculator 1643.

The remainder calculator 1643 receives the information about the frame main signal capacity from the capacity calculator 163, the information about the slot main signal capacity from the capacity calculator 163, and the information about the data volume from the TLV byte number extractor 1642. The remainder calculator 1643 calculates a frame remaining capacity by subtracting the data volume from the frame main signal capacity one by one. The remainder calculator 1643 outputs the calculated frame remaining capacity to the selector 1641. The remainder calculator 1643 calculates a slot remaining capacity by subtracting the data volume from the slot main signal capacity one by one. The remainder calculator 1643 outputs the calculated slot remaining capacity to the selector 1641.

The selector 1641 stores the TLV packet, the NTP packet, or the TLV NULL packet in the slot represented by the count value output from the slot number counter 161.

Upon storing the TLV packet, the NTP packet, or the TLV NULL packet in the slot, the selector 1641 calculates the present slot remaining capacity by subtracting the stored data volume from the slot remaining capacity output from the remainder calculator 1643. Also, upon storing the TLV packet, the NTP packet contained in a TLV packet, or the TLV NULL packet in the slot, the selector 1641 calculates the present frame remaining capacity by subtracting the stored data volume from the frame remaining capacity output from the remainder calculator 1643.

If storing the TLV packet, the NTP packet contained in a TLV packet, or the TLV NULL packet in the slot has caused the slot remaining capacity of the last valid slot for the frame to be less than 4 bytes, the selector 1641 outputs an instruction to the slot padding byte generator 167 to request slot padding bytes. In this instance, the selector 1641 may request the slot padding byte generator 167 to provide the same slot padding bytes, e.g., multiple bytes of "0x7e".

If the slot remaining capacity is 3 bytes, the selector 1641 may request 3 bytes of "0x7e". If the slot remaining capacity is 2 bytes, the selector 1641 may request 2 bytes of "0x7d". If the slot remaining capacity is 1 byte, the selector 1641 may request 1 byte of "0x7c". The request for the slot padding bytes by the selector 1641 is not limited to this, and various forms may be assumed. For example, if the slot remaining capacity is 3 bytes, the selector 1641 may request for "0x7e", "0x7d", and "0x7c". If the slot remaining capacity is 2 bytes, the selector 1641 may request for "0x7d" and "0x7c". If the slot remaining capacity is 1 byte, the selector 1641 may request for "0x7c".

Based on the setting information from the setting information receiver 162, the selector 1641 determines whether or not an NTP packet needs to be stored at the head of the slot represented by the number of the count value output from the slot number counter 161. If yes, the selector 1641 outputs an instruction to the NTP packet generator 166 to request for an NTP packet. The selector 1641 stores the NTP packet from the NTP packet generator 166 in the slot.

The selector 1641 instructs the TLV NULL packet generator 168 to generate the TLV NULL packet having a volume that is appropriate for the frame remaining capacity and the slot remaining capacity. The selector 1641, upon receiving the TLV NULL packet from the TLV NULL packet generator 168, stores the received TLV NULL packet in the slot.

The selector 1641 outputs the slot having stored the data to the slot information multiplexer 1644.

The slot information multiplexer 1644 receives the information about the frame main signal capacity from the capacity calculator 163, the information about the slot main signal capacity from the capacity calculator 163, the setting information from the setting information receiver 162, and the slot from the selector 1641. The slot information multiplexer 1644 generates slot information about the received slot based on the received frame main signal capacity, the received slot main signal capacity, and the received setting information. The slot information includes a synchronization signal, signal point arrangement information, and TMCC information. The signal point arrangement information indicates, for each slot, the head position of the first packet included and the tail position of the last packet included. The TMCC information includes information about the transmission mode containing the coding rate and the modulation scheme, information about the TLV stream ID, and so on. The slot information multiplexer 1644 multiplexes the generated slot information and the received slot, and outputs the slot information-multiplexed slot to the transmission processing apparatus 17. FIG. 5 is a schematic diagram illustrating the slot structures of the transmission main signals output from the slot information multiplexer 1644 to the transmission processing apparatus 17.

The transmission processing apparatus 17 includes, for example, a CPU, a memory for use in the CPU's processing, and an FPGA, etc. to perform given processing under the control of the CPU. With the CPU causing the FPGA to perform the given processing, the transmission processing apparatus 17 processes the transmission main signals. Specifically, the transmission processing apparatus 17 receives the transmission main signals from the transmission slotting apparatus 16 and modulates the received transmission main signals by the modulation scheme assigned for each slot. The transmission processing apparatus 17 performs predetermined transmission processing on the modulated signals and generates broadcast waves. The transmission processing apparatus 17 transmits the broadcast waves.

The transmission processing apparatus 17 may include an LSI instead of the CPU and the FPGA. Also, the transmission processing apparatus 17 may perform the given processing by software.

Figure 6:
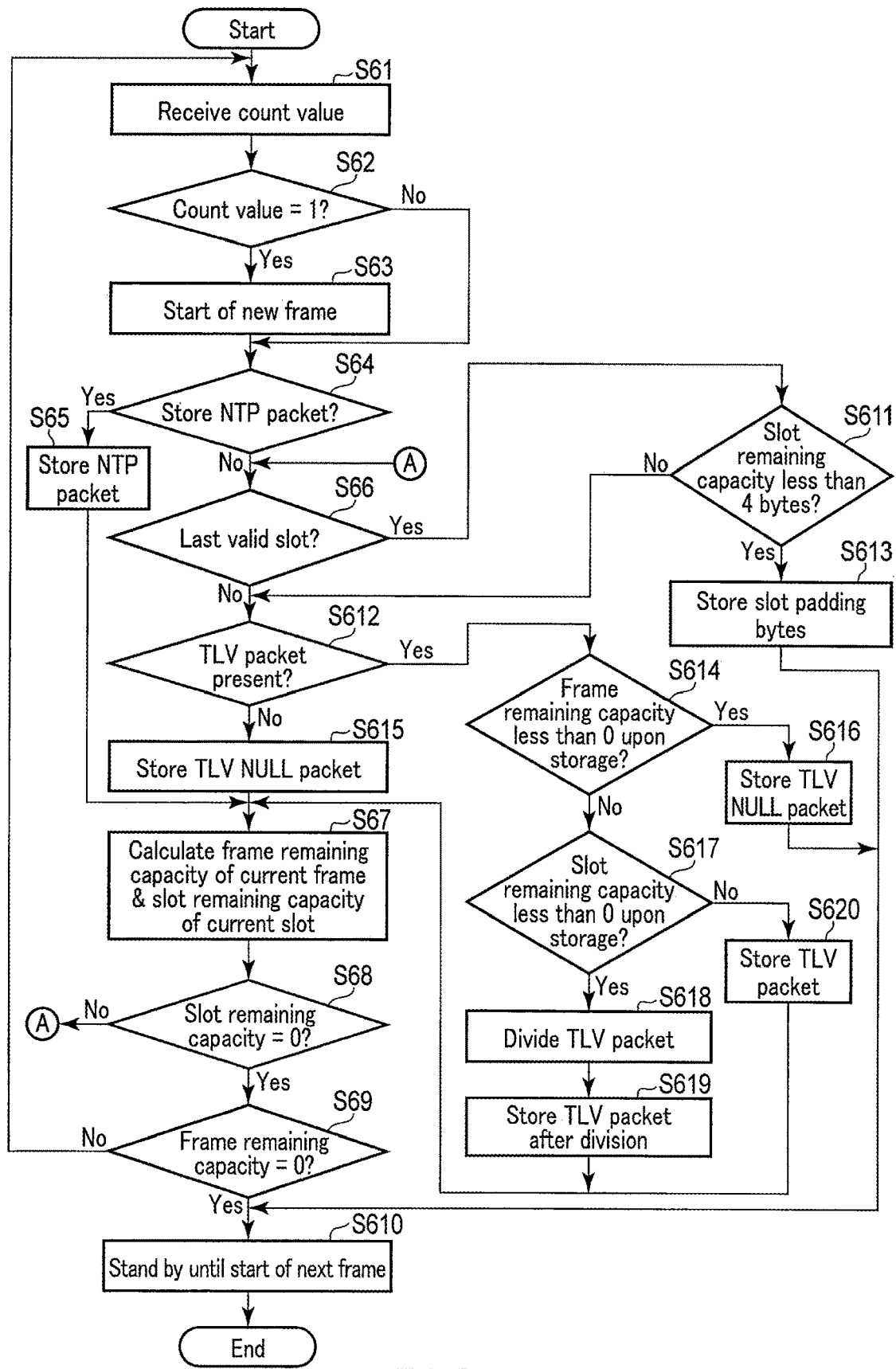
FIG. 6 is a flowchart showing the processes to perform when the selector of FIG. 4 stores received data in slots.

Next, the operation of the transmission slotting apparatus 16 configured as above will be described in detail. FIG. 6 is a flowchart showing an example of the processes to perform when the selector 1641 of FIG. 4 stores received data in slots. Note that FIG. 6 explains an exemplary case where one transmission mode is adopted for a frame, that is, where there is one combination of the modulation scheme and the coding rate in the setting information.

First, the selector 1641 receives a count value from the slot number counter 161 (step S61). The selector 1641 determines whether or not the received count value is 1 (step S62). If the received count value is 1 (Yes in step S62), the selector 1641 recognizes the start of a new frame (step S63). If the received count value is not 1 (No in step S62), the selector 1641 determines whether or not an NTP packet should be stored in the slot represented by the number of the count value (step S64).

If an NTP packet contained in a TLV packet needs to be stored in the slot (Yes in step S64), the selector 1641 stores the NTP packet at the head of the current slot (step S65). If it is not necessary to store an NTP packet in the slot (No in step S64), the selector 1641 determines whether or not the current slot is the last effective slot for the current frame (step S66).

Upon storing the data in the current slot, the selector 1641 updates the present slot remaining capacity by subtracting the stored data volume from the slot remaining capacity output from the remainder calculator 1643. Also, upon storing the data in the current slot, the selector 1641 updates the present frame remaining capacity by subtracting the stored data volume from the frame remaining capacity output from the remainder calculator 1643 (step S67).

Next, the selector 1641 determines whether or not the slot remaining capacity of the current slot is 0 (step S68). If the slot remaining capacity of the current slot is 0 (Yes in step S68), the selector 1641 determines whether or not the frame remaining capacity of the current frame is 0 (step S69). If the slot remaining capacity of the current slot is not 0 (No in step S68), the selector 1641 moves the processing to step S66.

If the frame remaining capacity of the current frame is 0 (Yes in step S69), the selector 1641 stands by until the start of the next frame (step S610). If the frame remaining capacity of the current frame is not 0 (No in step S69), the selector 1641 moves the processing to step S61.

In step S66, if the current slot is the last effective slot for the current frame (Yes in step S66), the selector 1641 determines whether or not the slot remaining capacity of the current slot is less than 4 bytes (step S611). If the current slot is not the last effective slot for the current frame (No in step S66), the selector 1641 determines whether or not there is a TLV packet to store in the current slot (step S612).

In step S611, if the slot remaining capacity of the current slot is less than 4 bytes (Yes in step S611), the selector 1641 stores slot padding bytes output from the slot padding byte generator 167 in the region of less than 4 bytes (step S613), and moves the processing to step S610.

In step S612, if there is a TLV packet to store in the current slot (Yes in step S612), the selector 1641 determines whether or not this TLV packet can not be stored completely in the current slot, that is, whether or not storing the TLV packet in the current slot will make the frame remaining capacity of the current frame less than 0 (step S614). If there is no TLV packet to store in the current slot (No in step S612), the selector 1641 stores the TLV NULL packet output from the TLV NULL packet generator 168 in the current slot (step S615), and moves the processing to step S67.

If storing the TLV packet in the current slot will make the frame remaining capacity of the current frame less than 0 (Yes in step S614), the selector 1641 couples together the current slot and the slots up to the last valid slot for the current frame, and stores a TLV NULL packet, not this TLV packet, in the coupled slots (step S616). If storing the TLV packet in the current slot will not make the frame remaining capacity of the current frame less than 0 (No in step S614), the selector 1641 determines whether or not storing the TLV packet in the current slot will make the slot remaining capacity of the current slot less than 0 (step S617).

If storing the TLV packet in the current slot will make the slot remaining capacity of the current slot less than 0 (Yes in step S617), the selector 1641 divides the TLV packet into a first TLV packet of a volume that can be stored in the current slot, and a second TLV packet of the other portion (step S618). The selector 1641 stores the first TLV packet after the division in the current slot (step S619), and moves the processing to step S67. If storing the TLV packet in the current slot will make the slot remaining capacity of the current slot 0 or more (No in step S617), the selector 1641 stores the TLV packet in the current slot (step S620), and moves the processing to step S67.

Figure 7:
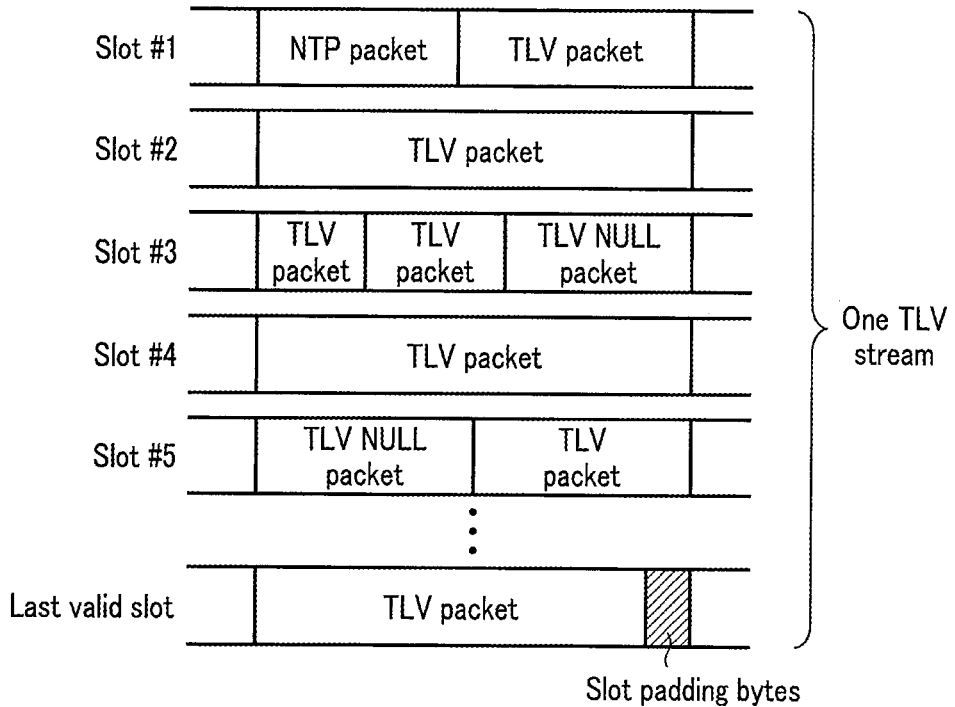
FIG. 7 is a diagram illustrating the transmission main signals output from the selector of FIG. 4.

By the selector 1641 performing the processes shown in FIG. 6, the slot group as shown in FIG. 7 will be output to the slot information multiplexer 1644. According to FIG. 7, the slot padding bytes are stored at the end of the last valid slot.

The case of one transmission mode for a frame has been described with FIG. 6. However, this is not a limitation. The selector 1641 can likewise be operable in the cases where two or more transmission modes are adopted for a frame.

When there are two or more transmission modes for a frame, the capacity calculator 163 calculates, as a frame main signal capacity, the capacity of the valid main signal portion for each transmission mode, based on the setting information.

The remainder calculator 1643 calculates the frame remaining capacity for each transmission mode by subtracting the data volume output from the TLV byte number extractor 1642 from the frame main signal capacity calculated for each transmission mode.

The selector 1641 stores TLV packets in slots, following the assignment of transmission modes to the slots as indicated by the setting information, and with reference to the frame remaining capacity and the slot remaining capacity.

Figure 8:
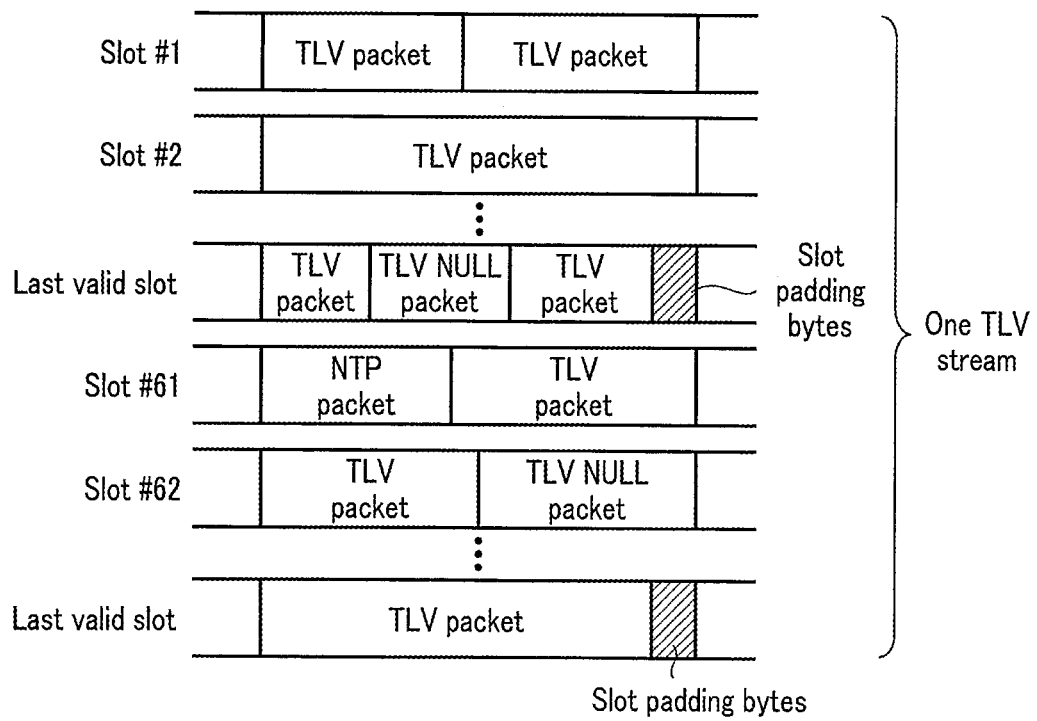
FIG. 8 is a diagram illustrating another example of the transmission main signals output from the selector of FIG. 4.

FIG. 8 shows the slot structures for the case of one TLV stream and two transmission modes. FIG. 8 assumes that the modulation scheme of the transmission mode assigned to slots #1 to #60 has a larger multi-value than the modulation scheme of the transmission mode assigned to slots #61 to #120. In this instance, the transmission mode assigned to slots #61 to #120 is more resistant to interference, and therefore, an NTP packet is disposed at the head of slot #61. Also, according to FIG. 8, slot padding bytes are stored at the end of the last valid slot in each transmission mode.

Figure 9:
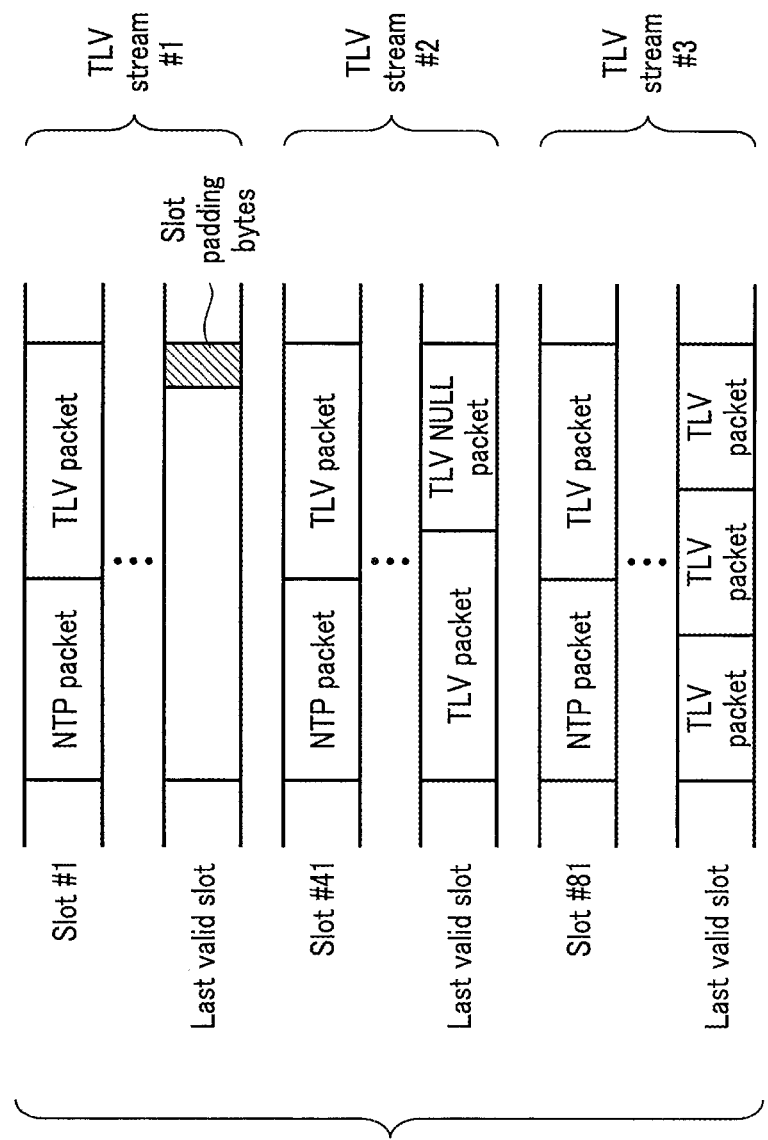
FIG. 9 is a diagram illustrating yet another example of the transmission main signals output from the selector of FIG. 4.

FIG. 9 shows the slot structures for the case of three TLV streams and three transmission modes. In FIG. 9, the NTP packet for the transmission mode assigned to slots #1 to #40 is stored at the head of slot #1, the NTP packet for the transmission mode assigned to slots #41 to #80 is stored at the head of slot #41, and the NTP packet for the transmission mode assigned to slots #81 to #120 is stored at the head of slot #81. Also, according to FIG. 9, slot padding bytes are stored at the end of the last valid slot in the transmission mode assigned to slots #1 to #40.

As described above, the transmitting system 10 according to the first embodiment calculates the frame main signal capacity and the slot main signal capacity by means of the capacity calculator 163 of the transmission slotting apparatus 16. The remainder calculator 1643 calculates the frame remaining capacity by subtracting the data volume of a TLV packet from the frame main signal capacity, and calculates the slot remaining capacity by subtracting the data volume of the TLV packet from the slot main signal capacity. Furthermore, if the slot remaining capacity of the last valid slot for a frame is less than 4 bytes, the selector 1641 stores slot padding bytes in the remaining region. This configuration enables the transmitting system 10 according to the first embodiment to store data until the end of the last valid slot for a frame, even when the slot remaining capacity of the last valid slot for the frame becomes less than 4 bytes due to the storage of TLV packets in valid slots.

Therefore, with the transmitting system 10 according to the first embodiment, broadcast waves can be transmitted in a normal way even if the remaining capacity of the last valid slot for the frame has become less than 4 bytes due to the storage of TLV packets in valid slots for the frame.

An option of coupling the 3-byte region left in the last valid slot for a preceding frame with the first slot for the succeeding frame so as to store a TLV NULL packet in the coupled slots can also be considered. However, it is prescribed for the storage of an NTP packet that its position be at the head of the first slot. As such, this option falls short of the functions achieved by the transmitting system according to the first embodiment.

Also, in the first embodiment, the slot padding byte generator 167 generates multiple slot padding bytes according to remaining capacities. The selector 1641 stores the slot padding bytes according to the remaining capacities. This configuration allows the receiving system 20 to comprehend, when it has received transmission main signals containing the slot padding bytes, how many bytes the slot padding bytes account for.

[Receiving System 20]

Figure 10:
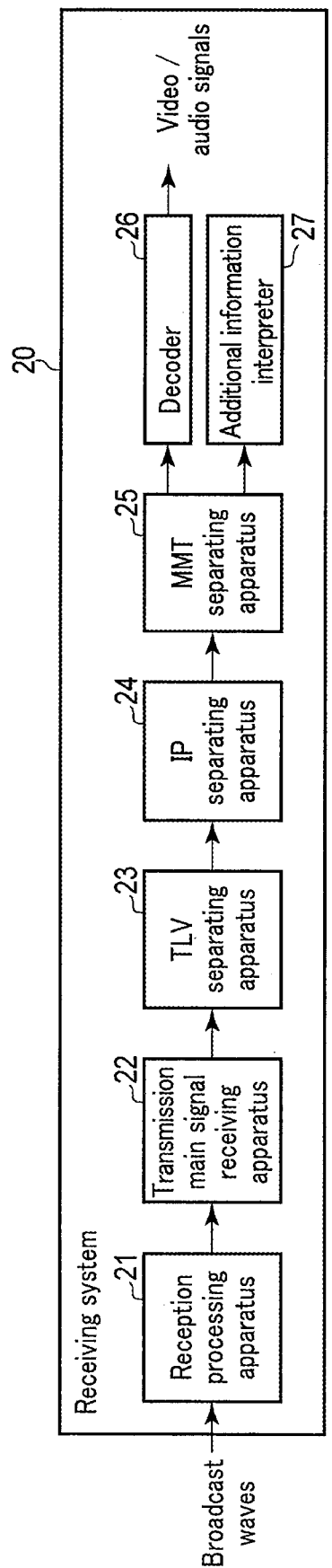
FIG. 10 is a block diagram illustrating a configuration of the receiving system of FIG. 1.

FIG. 10 is a block diagram illustrating a configuration of the receiving system 20 shown in FIG. 1. The receiving system 20 of FIG. 10 includes a reception processing apparatus 21, a transmission main signal receiving apparatus 22, a TLV separating apparatus 23, an IP separating apparatus 24, an MMT separating apparatus 25, a decoder 26, and an additional information interpreter 27.

The reception processing apparatus 21 receives broadcast waves sent via transmission channels such as a broadcast network. The reception processing apparatus 21 performs predetermined reception processing on the broadcast waves and converts the received broadcast waves into transmission main signals by the demodulation processing with a demodulation scheme corresponding to the modulation scheme assigned for each slot. The reception processing apparatus 21 outputs the transmission main signals to the transmission main signal receiving apparatus 22.

FIG. 11 is a block diagram illustrating an example of a functional configuration of the transmission main signal receiving apparatus of FIG. 10. FIG. 10 shows a data separator 221, an NTP time regenerator 222, a slot information interpreter 223, and a slot padding byte remover 224, and each of these functions is realized by a CPU causing an FPGA to perform given processing. The transmission main signal receiving apparatus 22 may include an LSI instead of the FPGA in order to realize the functions shown in FIG. 11. The transmission main signal receiving apparatus 22 may also realize the functions shown in FIG. 11 by software.

The data separator 221 receives the transmission main signals from the reception processing apparatus 21. The data separator 221 separates the slot information from the slots included in the received transmission main signals. The data separator 221 outputs the slot information after the separation to the slot information interpreter 223.

The data separator 221 refers to the slot headers of the slots included in the received transmission main signals and takes out main signals from the slots. The data separator 221 outputs the NTP packet included in the main signals to the NTP time regenerator 222. Also, the data separator 221 outputs the data included in the main signals, other than the NTP packet, to the slot padding byte remover 224.

The NTP time regenerator 222 generates NTP time information based on the NTP packet output from the data separator 221. The NTP time regenerator 222 adjusts an internally counting clock so that the generated NTP time information and the internally counted time information synchronize with each other, and outputs the internally counted time information to the succeeding apparatus. The clock is adjusted by, for example, comparing the NTP time information with the value of the internally counted time information, and controlling the oscillation frequency of a VCXO (Voltage Controlled Crystal Oscillator) to clock up when the internally counted time information is fast and to clock down when the internally counted time information is slow.

The slot information interpreter 223 receives the slot information from the data separator 221. The slot information interpreter 223 interprets the signal point arrangement information and the TMCC information included in the received slot information. The slot information interpreter 223 outputs the signal point arrangement information and the TMCC information to the slot padding byte remover 224.

The slot padding byte remover 224 memorizes in advance the data sequences to form slot padding bytes, for example, "0x7e". The slot padding byte remover 224 receives the signal point arrangement information and the TMCC information from the slot information interpreter 223. The slot padding byte remover 224 comprehends the transmission mode of the transmission main signals, the tail position of the last packet in the last valid slot for a frame, and so on, based on the received signal point arrangement information and the received TMCC information. The slot padding byte remover 224 determines, upon receiving the data from the data separator 221, whether or not the memorized data sequence is present at this tail position. If the received data includes slot padding bytes, the slot padding byte remover 224 removes at most 3 bytes of the slot padding bytes arranged from the tail position of the received data. The slot padding byte remover 224 outputs the data after removal of the slot padding bytes, that is, outputs the TLV packets or TLV NULL packets to the TLV separating apparatus.

The information memorized by the slot padding byte remover 224 is not limited to data sequences. For example, the slot padding byte remover 224 may memorize in advance that 3 bytes of data including "0x7e" are unnecessary if the slot includes "0x7e", that 2 bytes of data including "0x7d" are unnecessary if the slot includes "0x7d", and that 1 byte of data including "0x7c" is unnecessary if the slot includes "0x7c". In this instance, the slot padding byte remover 224, according to the slot padding bytes included in the data output from the data separator 221, removes the unnecessary data included in the received data.

The TLV separating apparatus 23 receives the TLV packet and the TLV NULL packet from the transmission main signal receiving apparatus 22. The TLV separating apparatus 23 takes out an IP packet from the received TLV packet. The TLV separating apparatus 23 outputs the extracted IP packet to the IP separating apparatus 24.

The IP separating apparatus 24 receives the IP packet from the TLV separating apparatus 23. The IP separating apparatus 24 takes out an MMTP packet from the received IP packet. The IP separating apparatus 24 outputs the extracted MMTP packet to the MMT separating apparatus 25.

The MMT separating apparatus 25 receives the MMTP packet from the IP separating apparatus 24. The MMT separating apparatus 25 takes out encoded signals and additional information from the received MMTP packet. The MMT separating apparatus 25 outputs the extracted encoded signals to the decoder 26, and outputs the extracted additional information to the additional information interpreter 27.

The decoder 26 receives the encoded signals from the MMT separating apparatus 25 and decodes them based on preset methods. The encoded signals are thereby converted into video and/or audio signals. The decoder 26 outputs the video and/or audio signals to the succeeding apparatus.

The additional information interpreter 27 receives the additional information from the MMT separating apparatus 25. The additional information interpreter 27 outputs the information read from the received additional information to the succeeding apparatus.

As described above, the receiving system 20 according to the first embodiment takes out main signals from slots by means of the transmission main signal receiving apparatus 22. The transmission main signal receiving apparatus 22 memorizes in advance the data sequences to form slot padding bytes. Then, if the main signals include slot padding bytes, the transmission main signal receiving apparatus 22 removes the slot padding bytes from the main signals. With this configuration, the transmission main signal receiving apparatus 22 can take out TLV packets from the transmission main signals in a normal way, even when the slots that form the transmission main signals include slot padding bytes.

Therefore, with the transmission main signal receiving apparatus 22 according to the first embodiment, the receiving system 20 can achieve normal reception of broadcast waves even when the transmission main signals from the transmitting system 10 include slot padding bytes.

Second Embodiment

The first embodiment has been described using an example where the transmission slotting apparatus 16 stores slot padding bytes in the vacant region if the slot remaining capacity of the last valid slot in the transmission main signals becomes less than 4 bytes. For the second embodiment, descriptions will be given using an example where a transmission slotting apparatus 18 stores packets in the slots so that the slot remaining capacity of the last valid slot in the transmission main signals will not become less than 4 bytes.

Figure 12:
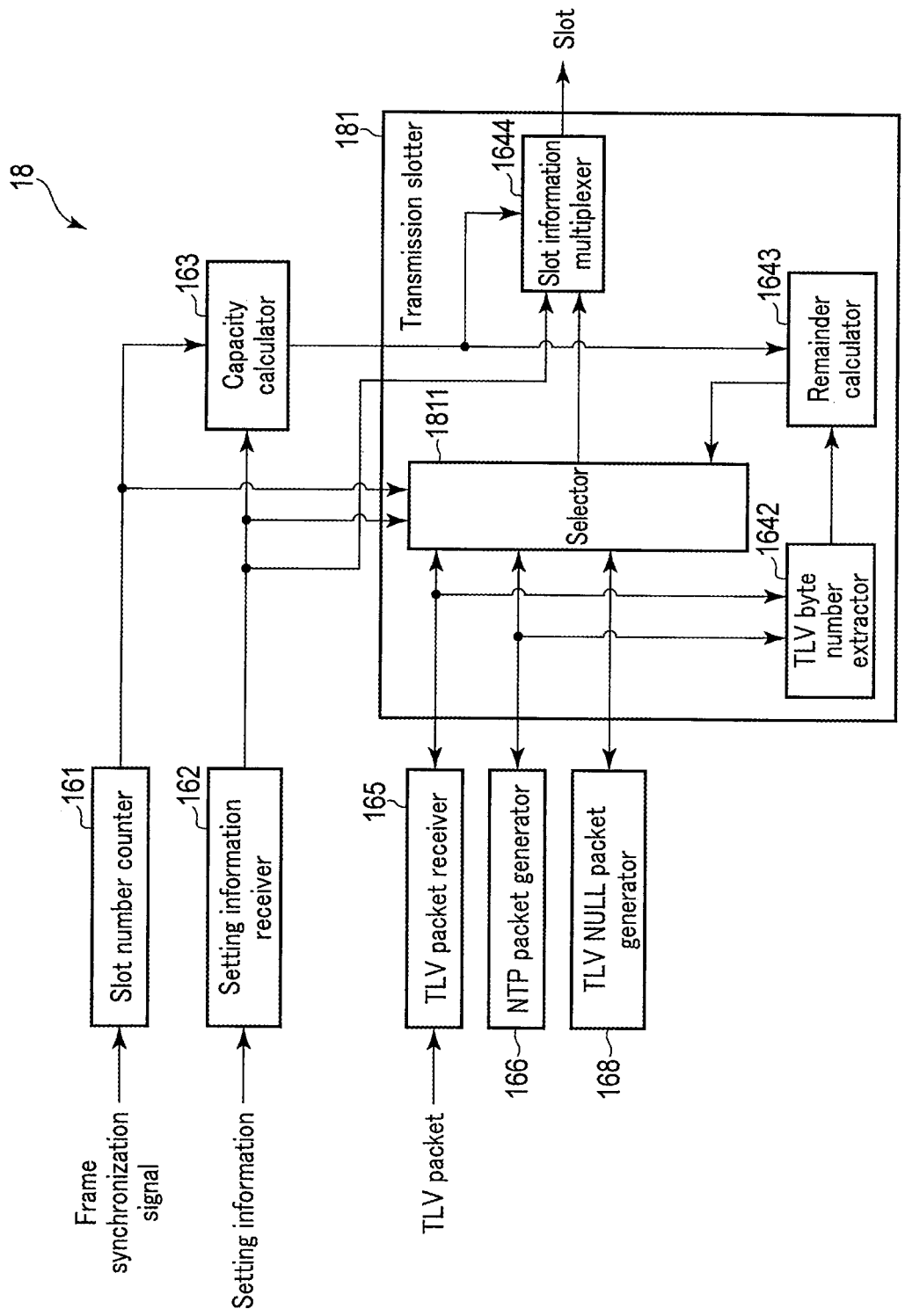
FIG. 12 is a block diagram illustrating an exemplary functional configuration of a transmission slotting apparatus according to a second embodiment.

FIG. 12 is a block diagram illustrating an example of a functional configuration of the transmission slotting apparatus 18 according to the second embodiment. FIG. 12 shows a slot number counter 161, a setting information receiver 162, a capacity calculator 163, a transmission slotter 181, a TLV packet receiver 165, an NTP packet generator 166, and a TLV NULL packet generator 168, and each of these functions is realized by a CPU causing an FPGA to perform given processing. The transmission slotting apparatus 18 may include an LSI instead of the FPGA in order to realize the functions shown in FIG. 12. The transmission slotting apparatus 18 may also realize the functions shown in FIG. 12 by software.

The transmission slotter 181 includes a selector 1811, a TLV byte number extractor 1642, a remainder calculator 1643, and a slot information multiplexer 1644.

The selector 1811 stores a TLV packet, an NTP packet, or a TLV NULL packet in the slot represented by the count value output from the slot number counter 161.

Upon storing the TLV packet, the NTP packet, or the TLV NULL packet in the slot, the selector 1811 calculates the present slot remaining capacity by subtracting the stored data volume from the slot remaining capacity output from the remainder calculator 1643. Also, upon storing the TLV packet, the NTP packet, or the TLV NULL packet in the slot, the selector 1811 calculates the present frame remaining capacity by subtracting the stored data volume from the frame remaining capacity output from the remainder calculator 1643.

Based on the setting information from the setting information receiver 162, the selector 1811 determines whether or not an NTP packet needs to be stored at the head of the slot represented by the number of the count value output from the slot number counter 161. If yes, the selector 1811 outputs an instruction to the NTP packet generator 166 to request an NTP packet. The selector 1811 stores the NTP packet from the NTP packet generator 166 in the slot.

The selector 1811 instructs the TLV NULL packet generator 168 to generate the TLV NULL packet having a volume that is appropriate for the frame remaining capacity and the slot remaining capacity. The selector 1811, upon receiving the TLV NULL packet from the TLV NULL packet generator 168, stores the received TLV NULL packet in the slot.

The selector 1811 outputs the slot having stored the data to the slot information multiplexer 1644.

Next, the processes to perform when the selector 1811 of FIG. 12 stores received packets in slots will be described in detail. FIG. 13 is a flowchart showing the processes to perform when the selector 1811 stores packets in slots. FIG. 13 explains an exemplary case where one transmission mode is adopted for a frame.

First, the selector 1811 receives a count value from the slot number counter 161 (step S131). The selector 1811 determines whether or not the received count value is 1 (step S132). If the received count value is 1 (Yes in step S132), the selector 1811 recognizes the start of a new frame (step S133). If the received count value is not 1 (No in step S132), the selector 1811 determines whether or not an NTP packet should be stored in the slot represented by the number of the count value (step S134).

If an NTP packet needs to be stored in the slot (Yes in step S134), the selector 1811 stores the NTP packet at the head of the current slot (step S135). If it is not necessary to store an NTP packet in the slot (No in step S134), the selector 1811 determines whether or not there is a TLV packet to store in the current slot (step S136).

Upon storing the data in the current slot, the selector 1811 updates the present slot remaining capacity by subtracting the stored data volume from the slot remaining capacity output from the remainder calculator 1643. Also, upon storing the data in the current slot, the selector 1811 updates the present frame remaining capacity by subtracting the stored data volume from the frame remaining capacity output from the remainder calculator 1643 (step S137).

Next, the selector 1811 determines whether or not the slot remaining capacity of the current slot is 0 (step S138). If the slot remaining capacity of the current slot is 0 (Yes in step S138), the selector 1811 determines whether or not the frame remaining capacity of the current frame is 0 (step S139). If the slot remaining capacity of the current slot is not 0 (No in step S138), the selector 1811 moves the processing to step S136.

If the frame remaining capacity of the current frame is 0 (Yes in step S139), the selector 1811 stands by until the start of the next frame (step S1310). If the frame remaining capacity of the current frame is not 0 (No in step S139), the selector 1811 moves the processing to step S131.

In step S136, if there is a TLV packet to store in the current slot (Yes in step S136), the selector 1811 determines whether or not storing the TLV packet in the current slot will make the frame remaining capacity of the current frame less than 4 bytes (step S1311). If there is no TLV packet to store in the current slot (No in step S136), the selector 1811 stores the TLV NULL packet output from the TLV NULL packet generator 168 in the current slot (step S1312), and moves the processing to step S137.

If storing the TLV packet in the current slot will make the frame remaining capacity of the current frame less than 4 bytes (Yes in step S1311), the selector 1811 couples together the current slot and the slots up to the last valid slot for the current frame, and stores a TLV NULL packet (or TLV NULL packets whose total size is equal to the frame remaining capacity) in the coupled slots (step S1313). If storing the TLV packet in the current slot will make the frame remaining capacity of the current frame 4 bytes or more (No in step S1311, the selector 1811 determines whether or not storing the TLV packet in the current slot will make the slot remaining capacity of the current slot less than 0 (step S1314).

If storing the TLV packet in the current slot will make the slot remaining capacity of the current slot less than 0 (Yes in step S1314), the selector 1811 divides the TLV packet into a first TLV packet of a volume that can be stored in the current slot, and a second TLV packet of the other portion (step S1315). The selector 1811 stores the first TLV packet after the division in the current slot (step S1316), and moves the processing to step S137. If storing the TLV packet in the current slot will make the slot remaining capacity of the current slot 0 or more (No in step S1314), the selector 1811 stores the TLV packet in the current slot (step S1317), and moves the processing to step S137.

The case of one transmission mode for a frame has been described with FIG. 13. However, this is not a limitation. The selector 1811 can be likewise operable in the cases where two or more transmission modes are adopted for a frame.

As described above, the transmitting system 10 according to the second embodiment calculates the frame main signal capacity and the slot main signal capacity by means of the capacity calculator 163 of the transmission slotting apparatus 18. The remainder calculator 1643 calculates the frame remaining capacity by subtracting the data volume of a TLV packet from the frame main signal capacity, and calculates the slot remaining capacity by subtracting the data volume of the TLV packet from the slot main signal capacity. Then, if storing the TLV packet in the slot will make the frame remaining capacity of the current frame less than 4 bytes, the selector 1811 stores a TLV NULL packet up to the end of the slot without storing a TLV packet. This configuration enables the transmitting system 10 according to the second embodiment to store TLV packets and TLV NULL packets until the end of the last valid slot for a frame.

Therefore, with the transmitting system 10 according to the second embodiment, it is possible to avoid the remaining capacity of the last valid slot for a frame becoming less than 4 bytes.

The first and second embodiments have been described using the examples where the transmission slotting apparatus 16 or 18 stores TLV packets in the main signal portions of slots. These TLV packets are, however, examples of variable-length packets that include information indicative of a data type and information indicative of a data byte number. As the variable-length packets that include information indicative of a data type and information indicative of a data byte number, packets other than TLV packets, for example, Generic Stream Encapsulated (GSE) packets may be named. In this sense, the TLV multiplexing apparatus 15 may be called a variable-length packet multiplexing apparatus.

Also, the first and second embodiments have been described so that a TLV packet takes the minimum byte number of 4 bytes and that the selector 1641 or 1811 operates according to whether or not the remaining capacity of the last valid slot is less than 4 bytes. However, the byte number used by the selectors 1641 and 1811 as a criterion for their determination is not limited to less than 4 bytes. Variable-length packets can take a minimum byte number other than 4 bytes. If a variable-length packet takes a minimum byte number of, for example, 2 bytes, the selector 1641 or 1811 may operate according to whether or not the remaining capacity of the last valid slot is less than 2 bytes.

While certain embodiments have been described, they have been presented by way of example only, and are not intended to limit the scope of the invention. Indeed, the novel embodiments described herein may be embodied in a variety of other forms. Furthermore, various omissions, substitutions and changes in the form of the embodiments may be made without departing from the spirit of the invention. The accompanying claims and their equivalents are intended to cover such forms or modifications as would fall within the scope and spirit.

The invention claimed is:

1. A receiving apparatus comprising:
at least one processor or at least one circuit configured to:
receive a transmission main signal comprising a plurality of slots, the transmission main signal storing a data sequence of a predetermined data byte number at an end of a last valid slot for one frame among the slots, the data sequence being predetermined for each case of a remaining capacity of the last valid slot in the transmission main signal being less than a minimum byte number of a variable-length packet comprising information indicative of a type of data and information indicative of a byte number of the data;
take out slot information including information about the slots and a slot main signal from the slots of the received transmission main signal;
interpret the slot information to acquire information about the slots, the acquired information indicating a tail position of a last packet for each slot and a transmission mode containing a coding rate and a modulation scheme;
comprehend a transmission mode of the transmission main signal and a tail position of a last packet in the last valid slot for one frame based on the acquired information;
determine a presence of the data sequence in the tail position of the last packet in the last valid slot based on a prestored data sequence;
recognize a volume to remove, in accordance with the data sequence present; and
remove the volume from the slot main signal.

* * * * *